US012737858B2

(12) United States Patent
Liba et al.

(10) Patent No.: US 12,737,858 B2
(45) Date of Patent: Sep. 15, 2026

(54) BYSTANDER AND ATTACHED OBJECT REMOVAL

(71) Applicant: Google LLC, Mountain View, CA (US)

(72) Inventors: Orly Liba, Mountain View, CA (US); Pedro Velez, Mountain View, CA (US); Siyang Li, Mountain View, CA (US); Huizhong Chen, Mountain View, CA (US); Marcel Puyat, Mountain View, CA (US); Yanan Bao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 201 days.

(21) Appl. No.: 18/293,678

(22) PCT Filed: Jun. 30, 2022

(86) PCT No.: PCT/US2022/035793

§ 371 (c)(1),
(2) Date: Jan. 30, 2024

(87) PCT Pub. No.: WO2024/005832

PCT Pub. Date: Jan. 4, 2024

(65) Prior Publication Data

US 2024/0346631 A1 Oct. 17, 2024

(51) Int. Cl.
*G06T 5/77* (2024.01)
*G06N 20/00* (2019.01)
(Continued)

(52) U.S. Cl.
CPC .................. *G06T 5/77* (2024.01); *G06T 5/60* (2024.01); *G06T 7/11* (2017.01); *G06T 7/136* (2017.01);
(Continued)

(58) Field of Classification Search
USPC ................................ 382/173, 155–156, 159
See application file for complete search history.

(56) References Cited

U.S. PATENT DOCUMENTS 10,540,768 B2 * 1/2020 Yoo .......................... G06T 7/143
11,176,679 B2 * 11/2021 Lin .......................... G06V 20/30
(Continued)

FOREIGN PATENT DOCUMENTS

| | | |
|---|---|---|
| CN | 112967355 | 6/2021 |
| CN | 113724153 | 11/2021 |
| WO | 2021/010974 | 1/2021 |

OTHER PUBLICATIONS

JPO, Office Action (with English translation) for Japanese Patent Application No. 2023-531632, Sep. 10, 2024, 9 pages.
(Continued)

*Primary Examiner* — Ishrat I Sherali
(74) *Attorney, Agent, or Firm* — IP Spring

(57) ABSTRACT

A media application detects a bystander in an initial image. The media application generates a bystander box that includes the bystander, wherein all pixels for the bystander are within the bystander box. The media application generates localizer boxes that encompass the bystander and one or more objects that are attached to the bystander. The media application aggregates the bystander box and one or more of the localizer boxes to form an aggregated box. The media application applies a segmenter to the initial image, based on the aggregated box, to segment the bystander and the one or more objects from the initial image to generate a bystander mask, wherein the bystander mask includes a subset of pixels within the aggregated box. The media application generates an inpainted image that replaces all pixels within the bystander mask with pixels that match a background in the initial image.

20 Claims, 11 Drawing Sheets

(51) Int. Cl.
*G06T 5/60* (2024.01)
*G06T 7/11* (2017.01)
*G06T 7/136* (2017.01)
*G06T 7/194* (2017.01)

(52) U.S. Cl.
CPC .... *G06T 7/194* (2017.01); *G06T 2207/20021* (2013.01); *G06T 2207/20081* (2013.01); *G06T 2207/30196* (2013.01); *G06T 2210/12* (2013.01)

(56) References Cited

U.S. PATENT DOCUMENTS

| | | | | |
|---|---|---|---|---|
| 11,676,390 | B2 * | 6/2023 | Tang | G06T 7/74 382/103 |
| 12,456,243 | B2 * | 10/2025 | Kim | G06T 11/60 |
| 2015/0221066 | A1 | 8/2015 | Kobayashi | |
| 2020/0258236 | A1 | 8/2020 | Lin | |
| 2022/0129682 | A1 | 4/2022 | Tang et al. | |
| 2024/0378844 | A1 * | 11/2024 | Yu | G06V 10/774 |

OTHER PUBLICATIONS

"Object Detection and Classification using R-CNNs", TELESENS, retrieved from Internet: https://www.telesens.co/2018/03/11/object-detection-and-classification-using-r-cnns/, Mar. 11, 2018, 18 pages.
JPO, Office Action (with English translation) for Japanese Patent Application No. 2023-531632, Sep. 10, 2024, 5 pages.
KIPO, Office Action (with English translation) for Korean Patent Application No. 10-2023-7012046, May 21, 2024, 17 pages.
Rana, et al., "Selection of object detections using overlap map predictions", Neural Computing and Applications, vol. 34, Jun. 20, 2022, pp. 18611-18627.
EPO, Communication Pursuant to Article 94(3) EPC for European Patent Application No. 22751499.9, Mar. 18, 2025, 6 pages.
JPO, Notice of Allowance (with English translation) for Japanese Patent Application No. 2023-531632, Feb. 18, 2025, 5 pages.
KIPO, Notice of Allowance (with English translation) for Korean Patent Application No. 10-2023-7012046, Jan. 14, 2025, 5 pages.
EPO, Communication under Rule 71(3) EPC for European Patent Application No. 22751499.9, Oct. 6, 2025, 6 pages.
Cai, Xiuxia et al., "Semantic object removal with convolutional neural network feature-based inpainting approach", Multimedia Systems, vol. 24, No. 5, Feb. 1, 2018, pp. 597-609.
EPO, Written Opinion for International Patent Application No. PCT/US2022/035793, Feb. 20, 2023, 11 pages.
EPO, International Search Report for International Patent Application No. PCT/US2022/035793, Feb. 20, 2023, 4 pages.
Lu, Ruiqi et al., "Occluded Pedestrian Detection with Visible IoU and Box Sign Predictor", 2019 IEEE International Conference on Image Processing (ICIP), Sep. 22, 2019, pp. 1640-1644.
Olowolayemo, Akeen et al., "Automatic Stranger Remover in Photo by Deep Learning Segmentation", Proceedings of the 2018 International Conference on Image and Graphics Processing, Feb. 24, 2018, pp. 115-120.
CNIPA, First Office Action (with English translation) for Chinese Patent Application No. 202280006658.6, Mar. 5, 2026, 10 pages.
Criminisi, A. et al., "Object Removal by Exemplar-Based Inpainting," 2003 IEEE Computer Society Conference on Computer Vision and Pattern Recognition, 2003, pp. 16-22.
CNIPA, Notification for Patent Registration Formalities and Notification on the Grant of Patent Right for Invention (with English translation) for Chinese Patent Application No. 202280006658.6, Jul. 10, 2026, 5 pages.

* cited by examiner

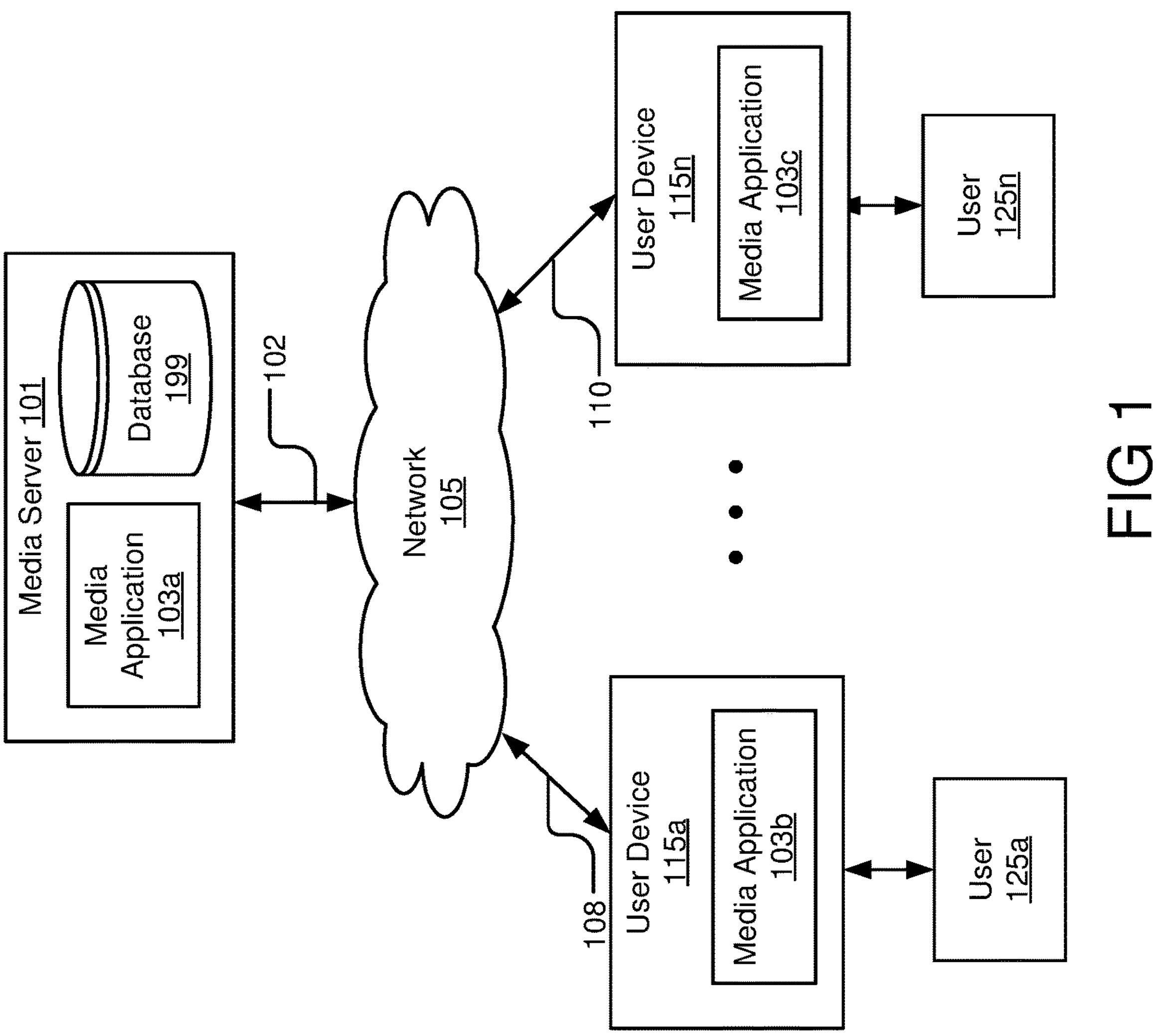
Media Server 101
Media Application 103a
Database 199
102
Network 105
108
User Device 115a
Media Application 103b
User 125a
110
User Device 115n
Media Application 103c
User 125n
FIG 1
100

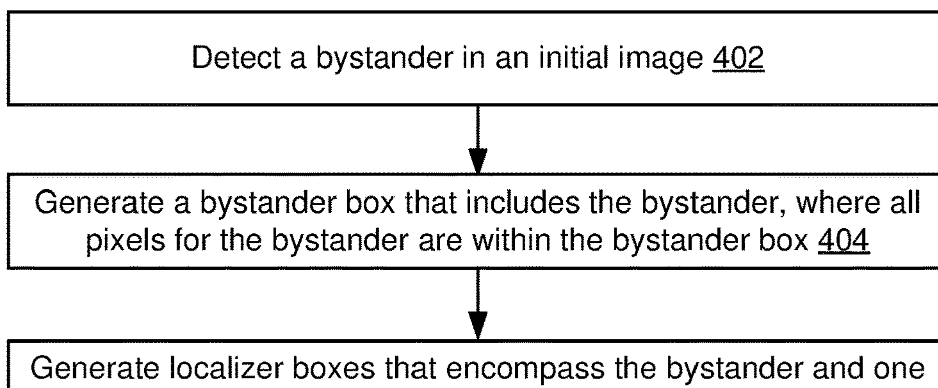

Aggregate the bystander box and one or more of the localizer boxes to form an aggregated box 408

Apply a segmenter to the initial image, based on the aggregated box, to segment the bystander and the one or more objects from the initial image to generate a bystander mask, where the bystander mask includes a subset of pixels within the aggregated box 410

Generate an inpainted image that replaces all pixels within the bystander mask with pixels that match a background in the initial image 412

FIG 4

Obtain a synthetic training data set that is generated to include training images that each include a bystander attached to an object and a subject 502

↓

Obtain a trained machine-learning model by training a raw machine-learning model using the synthetic training data set as input, where the training is performed using supervised learning 504

↓

Receive, as input to the trained machine-learning model, an initial image with an aggregated box that surrounds a bystander and one or more objects attached to the bystander 506

↓

Output, with the trained machine-learning model, a bystander mask that includes a subset of pixels within the aggregated box 508

FIG 5

BYSTANDER AND ATTACHED OBJECT REMOVAL

CROSS-REFERENCE TO RELATED APPLICATIONS

This application is the U.S. National Stage filing under 35 U.S.C. § 371 of International Patent Application No. PCT/US2022/035793, filed on Jun. 30, 2022, which is incorporated herein by reference in its entirety for all purposes.

BACKGROUND

Object classification in visual media items, such as images (static images, images with selective motion, etc.) and videos can be improved by removing bystanders that distract from the focus of the media items. However, when a bystander is attached to an object (e.g., a person riding a bicycle/skateboard, holding a bag, etc.), pixels associated with the bystander may be identified and pixels associated with the object may not be identified. When such classification is used for image editing purposes (e.g., substituting the bystander with pixels that match background), the resultant image may be unsatisfactory due to presence of pixels associated with the object.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes detecting a bystander in an initial image. The method further includes generating a bystander box that includes the bystander, wherein all pixels for the bystander are within the bystander box. The method further includes generating a bystander box that includes the bystander, wherein all pixels for the bystander are within the bystander box. The method further includes generating localizer boxes that encompass the bystander and one or more objects that are attached to the bystander. The method further includes aggregating the bystander box and one or more of the localizer boxes to form an aggregated box. The method further includes applying a segmenter to the initial image, based on the aggregated box, to segment the bystander and the one or more objects from the initial image to generate a bystander mask, wherein the bystander mask includes a subset of pixels within the aggregated box. The method further includes generating an inpainted image, wherein all pixels within the bystander mask are replaced in the inpainted image with pixels that match a background in the initial image. In one example, the method or at least one or several steps of the method may be carried out or provided by a machine-learning model. The machine-learning model may be for example the trained machine-learning model obtained by the training method described below. Accordingly, the machine-learning model may carry out at least one of the following steps: generating localizer boxes, forming an aggregated box, applying a segmenter, and optionally also generating an inpainted image. The machine-learning model may further carry out any of the method steps described below. Instead of using one single model, also a plurality of models may be used.

In some embodiments, the method further includes before applying the segmenter to the initial image, defining the aggregated box as being the bystander box, for each of the localizer boxes, computing an intersection over union (IoU) ratio of the aggregated box to a localizer box, and responsive to the intersection over union ratio exceeding a threshold value or responsive to an area of overlap between the aggregated box and the localizer box exceeding an occupancy threshold, increasing a size of the aggregated box. In some embodiments, wherein the IoU ratio is the area of overlap between the aggregated box and the localizer box divided by an area of union between the aggregated box and the localizer box, and the method further comprises padding the aggregated box. In some embodiments, applying the segmenter to the initial image includes segmenting a foreground from a background to distinguish the one or more objects attached to the bystander from the background. In some embodiments, the method further includes determining if a subject of the initial image occludes the bystander and responsive to determining that the subject of the initial image occludes the bystander, generating a subject mask and updating the bystander mask to remove pixels that are within the subject mask. In some embodiments, the segmenter is a trained machine-learning model. In some embodiments, the localizer boxes include one or more of a subject, the bystander, or objects in the initial image, and the method further includes removing corresponding localizer boxes that are associated with the subject.

In some embodiments, a computer-implemented method (e.g., also referred to as a training method) includes: obtaining a synthetic training data set that is generated to include training images that each include superimposing an object onto a background image and obtaining a trained machine-learning model by: providing the synthetic training dataset as input to a raw machine-learning model, outputting predicted bystander boxes for training images, comparing each predicted bystander box to a groundtruth bystander mask that corresponds to a training image, and adjusting one or more parameters of the raw machine-learning model based on the comparing, where the trained machine-learning model is trained to receive an initial image and output a bystander mask that includes a subset of pixels within the aggregated box.

In some embodiments, the trained machine-learning model is a neural network that includes multiple layers and outputting, with the trained machine-learning model, the bystander mask includes: a first layer that segments an image into a foreground and a background by, for each pixel, classifying the pixel as one of: part of the foreground or part of the background and an output layer that outputs, for each pixel, whether the pixel is part of a bystander mask, a subject mask, or neither, wherein the first layer precedes the output layer in the neural network. In some embodiments, the method further includes receiving, as input to the trained machine-learning model, the initial image with an aggregated box that encompasses a bystander and one or more objects attached to the bystander, outputting, with the trained machine-learning model, a bystander mask that includes a subset of pixels within the aggregated box, and generating an inpainted image, wherein all pixels within the bystander mask are replaced in the inpainted image with pixels that match a background in the initial image. In some embodiments, the method further includes before receiving the initial image as input to the trained machine-learning model: detecting the bystander in the initial image, generating a bystander box that includes the bystander, wherein all pixels for the bystander are within the bystander box, generating localizer boxes that encompass the bystander and the one or more objects that are attached to the bystander, and aggregating the bystander box and one or more of the localizer boxes to form the aggregated box. In some embodiments, the method further includes defining the aggregated box as being the bystander box, for each of the localizer boxes, computing an intersection over union (IoU) ratio of the aggregated box to a localizer box, and responsive to the intersection over union ratio exceeding a threshold value or responsive to an area of overlap between the aggregated box and the localizer box exceeding an occupancy threshold, increasing a size of the aggregated box. In some embodiments, the IoU ratio is the area of overlap between the aggregated box and the localizer box divided by an area of union between the aggregated box and the localizer box, and the method further includes padding the aggregated box. In some embodiments, outputting the bystander mask includes outputting a corresponding confidence value and, responsive to the corresponding confidence value failing to meet a confidence threshold, adding a blur around edges of the bystander.

In some embodiments, a computing device comprises one or more processors and a memory coupled to the one or more processors, with instructions stored thereon that, when executed by the processor, cause the processor to perform operations. The operations may include detecting a bystander in an initial image, generating a bystander box that includes the bystander, wherein all pixels for the bystander are within the bystander box, generating localizer boxes that encompass the bystander and one or more objects that are attached to the bystander, aggregating the bystander box and one or more of the localizer boxes to form an aggregated box, applying a segmenter to the initial image, based on the aggregated box, to segment the bystander and the one or more objects from the initial image to generate a bystander mask, wherein the bystander mask includes a subset of pixels within the aggregated box, and generating an inpainted image, wherein all pixels within the bystander mask are replaced in the inpainted image with pixels that match a background in the initial image.

In some embodiments, the operations further include before applying the segmenter to the initial image, defining the aggregated box as being the bystander box, for each of the localizer boxes, computing an intersection over union (IoU) ratio of the aggregated box to a localizer box, and responsive to the intersection over union ratio exceeding a threshold value or responsive to an area of overlap between the aggregated box and the localizer box exceeding an occupancy threshold, increasing a size of the aggregated box. In some embodiments, the IoU ratio is the area of overlap between the aggregated box and the localizer box divided by an area of union between the aggregated box and the localizer box, and the operations further includes padding the aggregated box. In some embodiments, applying the segmenter to the initial image includes segmenting a foreground from a background to distinguish the one or more objects attached to the bystander from the background. In some embodiments, the operations further include determining if a subject of the initial image occludes the bystander and responsive to determining that the subject of the initial image occludes the bystander, generating a subject mask and updating the bystander mask to remove pixels that are within the subject mask. In some embodiments, the segmenter is a trained machine-learning model.

The techniques described in the specification advantageously solve the problem of identifying objects for removal from the image when the objects are attached to a bystander by generating an aggregated box that includes the bystander and one or more objects attached to the bystander, a bystander mask that includes a subset of pixels within the aggregated box, and generating an inpainted image that replaces the pixels within the bystander mask with pixels that match a background in the initial image. In some embodiments, where a subject of the initial image occludes the bystander, the application describes techniques for generating a subject mask where the pixels that are part of the subject mask are retained in the final image, generated based on a pixel mask that does not include subject pixels in the bystander mask. The described techniques can automatically perform image editing to remove bystanders and attached objects, or other actions such as blurring bystanders and attached objects, etc. to produce a final image.

The methods of the present disclosure therefore solve various technical problems. For example, the methods may provide images with removed bystanders, which can ameliorate a more reliable and/or precise detection of the subject of the initial image (e.g., by using the same model having respective capabilities or another model). In another example, the provided images with removed bystanders may be used as an optimized dataset for training another machine-learning model (e.g., one for person detection or image classification). The dataset may be optimized, as any confusing bystander are removed, which could confuse the model in the training task.

BRIEF DESCRIPTION OF THE DRAWINGS

FIG. 1 is a block diagram of an example network environment, according to some embodiments described herein.

FIG. 4 illustrates an example flowchart to generate an inpainted image with bystander and attached object removed, according to some embodiments described herein.

FIG. 5 illustrates an example flowchart to generate a bystander mask, according to some embodiments described herein.

DETAILED DESCRIPTION

Example Environment 100

Figure 2:
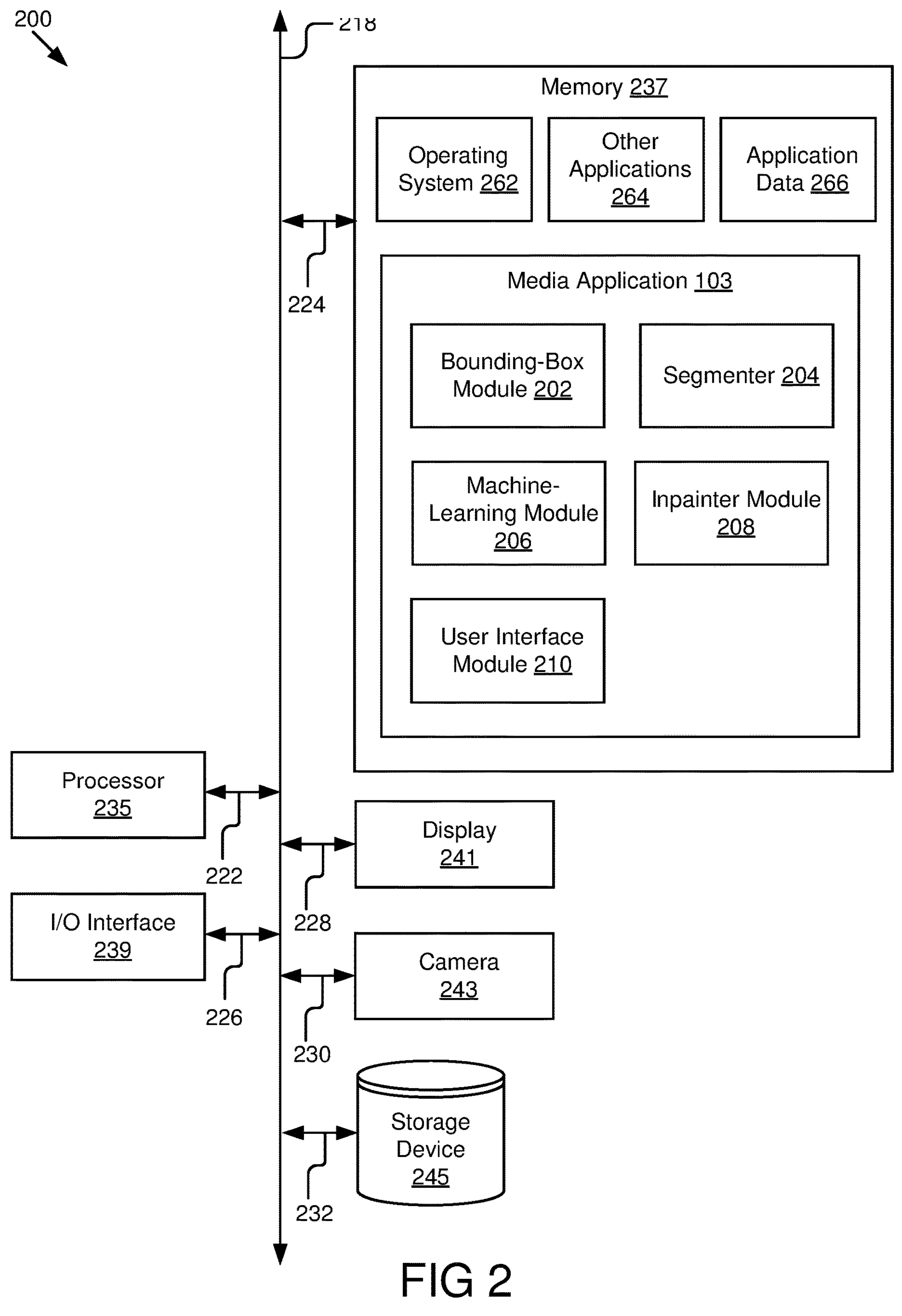
FIG. 2 is a block diagram of an example computing device, according to some embodiments described herein.

FIG. 1 illustrates a block diagram of an example environment 100. In some embodiments, the environment 100 includes a media server 101, a user device 115*a*, and a user device 115*n* coupled to a network 105. Users 125*a*, 125*n* may be associated with respective user devices 115*a*, 115*n*. In some embodiments, the environment 100 may include other servers or devices not shown in FIG. 1. In FIG. 1 and the remaining figures, a letter after a reference number, e.g., "115*a*," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115*a*, 115*n* via the network 105. The media server 101 may include a media application 103*a* and a database 199.

The database 199 may store machine-learning models, training data sets, images, etc. The database 199 may also store social network data associated with users 125, user preferences for the users 125, etc.

The user device 115 may be a computing device that includes a memory coupled to a hardware processor. For example, the user device 115 may include a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115*a* is coupled to the network 105 via signal line 108 and user device 115*n* is coupled to the network 105 via signal line 110. The media application 103 may be stored as media application 103*b* on the user device 115*a* and/or media application 103*c* on the user device 115*n*. Signal lines 108 and 110 may be wired connections, such as Ethernet, coaxial cable, fiber-optic cable, etc., or wireless connections, such as Wi-Fi®, Bluetooth®, or other wireless technology. User devices 115*a*, 115*n* are accessed by users 125*a*, 125*n*, respectively. The user devices 115*a*, 115*n* in FIG. 1 are used by way of example. While FIG. 1 illustrates two user devices, 115*a* and 115*n*, the disclosure applies to a system architecture having one or more user devices 115.

The media application 103 may be stored on the media server 101 or the user device 115. In some embodiments, the operations described herein are performed on the media server 101 or the user device 115. In some embodiments, some operations may be performed on the media server 101 and some may be performed on the user device 115. Performance of operations is in accordance with user settings. For example, the user 125*a* may specify settings that operations are to be performed on their respective device 115*a* and not on the server 101. With such settings, operations described herein (e.g., with reference to FIGS. 4-6) are performed entirely on user device 115*a* and no operations are performed on the media server 101. Further, a user 125*a* may specify that images and/or other data of the user is to be stored only locally on a user device 115*a* and not on the media server 101. With such settings, no user data is transmitted to or stored on the media server 101. Transmission of user data to the media server 101, any temporary or permanent storage of such data by the media server 101, and performance of operations on such data by the media server 101 are performed only if the user has agreed to transmission, storage, and performance of operations by the media server 101. Users are provided with options to change the settings at any time, e.g., such that they can enable or disable the use of the media server 101.

Machine learning models (e.g., neural networks or other types of models), if utilized for one or more operations, are stored and utilized locally on a user device 115, with specific user permission. Server-side models are used only if permitted by the user. Model training is performed using a synthetic data set, as described below with reference to FIG. 5. Further, a trained model may be provided for use on a user device 115. During such use, if permitted by the user 125, on-device training of the model may be performed. Updated model parameters may be transmitted to the media server 101 if permitted by the user 115, e.g., to enable federated learning. Model parameters do not include any user data.

The media application 103 receives an image. For example, the media application 103 receives an image from a camera that is part of the user device 115 or the media application 103 receives the image over the network 105. The media application 103 detects one or more bystanders in an initial image and generates a bystander box that includes the bystander, where all pixels for the bystander are within the bystander box. The media application 103 further generates one or more localizer boxes that encompass one or more objects that are attached to the bystander and aggregates the bystander box and the one or more localizer boxes to form an aggregated box.

The media application 103 applies a segmenter to the initial image, based on the aggregated box, to segment the bystander and the one or more objects from the initial image to generate a bystander mask, wherein the bystander mask includes a subset of pixels within the aggregated box. The media application 103 generates an inpainted image that replaces all pixels within the bystander mask with pixels that match a background in the initial image.

In some embodiments, the media application 103 may be implemented using hardware including a central processing unit (CPU), a field-programmable gate array (FPGA), an application-specific integrated circuit (ASIC), machine learning processor/co-processor, any other type of processor, or a combination thereof. In some embodiments, the media application 103*a* may be implemented using a combination of hardware and software.

Example Computing Device 200

FIG. 2 is a block diagram of an example computing device 200 that may be used to implement one or more features described herein. Computing device 200 can be any suitable computer system, server, or other electronic or hardware device. In one example, computing device 200 is media server 101 used to implement the media application 103*a*. In another example, computing device 200 is a user device 115.

In some embodiments, computing device 200 includes a processor 235, a memory 237, an input/output (I/O) interface 239, a display 241, a camera 243, and a storage device 245 all coupled via a bus 218. The processor 235 may be coupled to the bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including a media application 103.

The memory 237 may include an operating system 262, other applications 264, and application data 266. Other applications 264 can include, e.g., an image library application, an image management application, an image gallery application, communication applications, web hosting engines or applications, media sharing applications, etc. One or more methods disclosed herein can operate in several environments and platforms, e.g., as a stand-alone computer program that can run on any type of computing device, as a web application having web pages, as a mobile application ("app") run on a mobile computing device, etc.

The application data 266 may be data generated by the other applications 264 or hardware of the computing device 200. For example, the application data 266 may include images used by the image library application and user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via I/O interface 239. In some embodiments, the I/O interface 239 can connect to interface devices such as input devices (keyboard, pointing device, touchscreen, microphone, scanner, sensors, etc.) and/or output devices (display devices, speaker devices, printers, monitors, etc.).

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes a graphical guide on a viewfinder. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store a training data set that includes labeled images, a machine-learning model, output from the machine-learning model, etc.

FIG. 2 illustrates an example media application 103, stored in memory 237, that includes a bounding-box module 202, a segmenter 204, a machine-learning module 206, an inpainter module 208, and a user interface module 210.

The bounding-box module 202 generates bounding boxes. In some embodiments, the bounding-box module 202 includes a set of instructions executable by the processor 235 to generate the bounding boxes. In some embodiments, the bounding-box module 202 is stored in the memory 237 of the computing device 200 and can be accessible and executable by the processor 235.

Figure 3A:
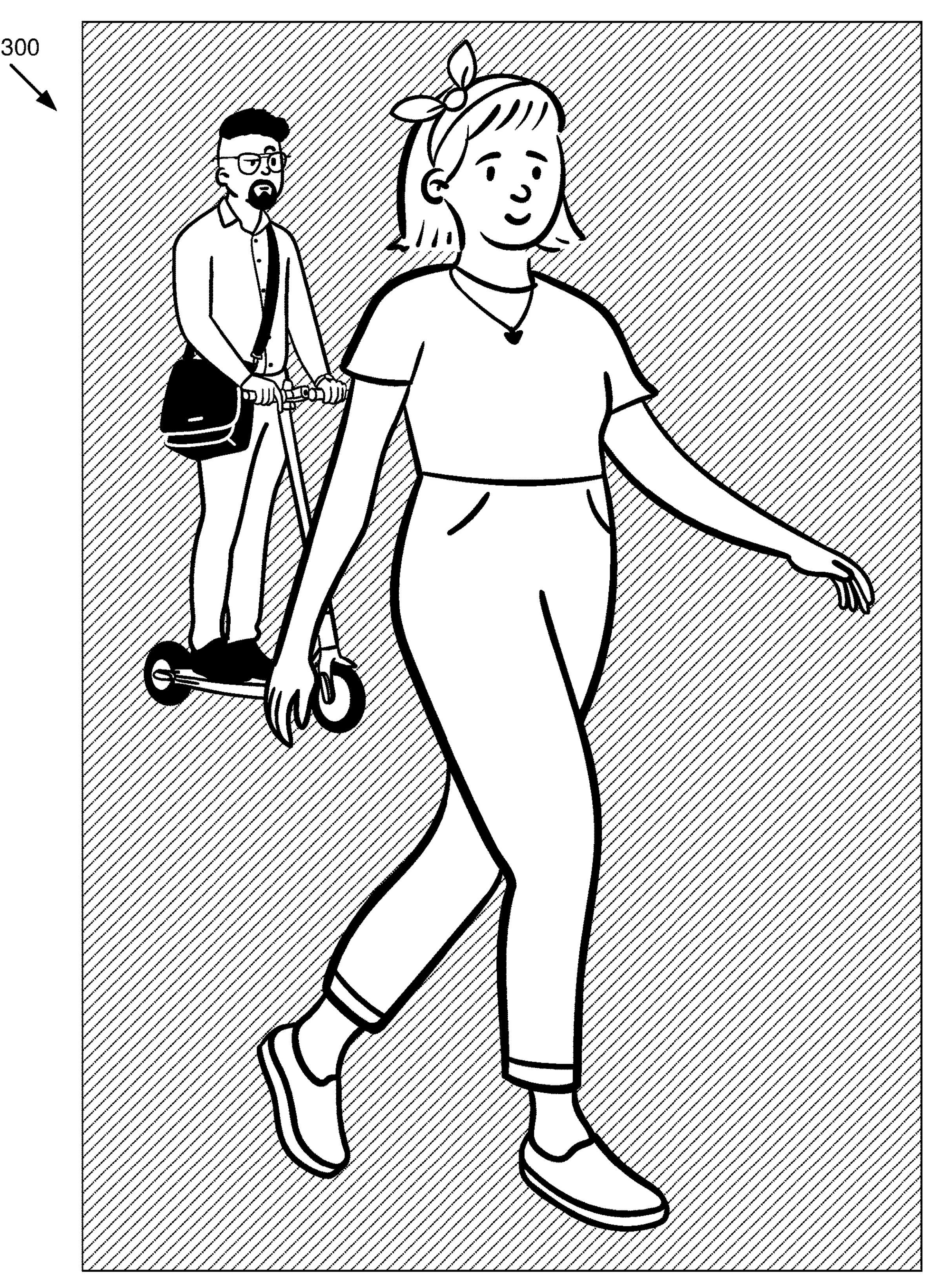
FIG. 3A illustrates an example initial image, according to some embodiments described herein.

In some embodiments, the bounding-box module 202 receives an initial image. The initial image may be received from the camera 243 of the computing device 200 or from the media server 101 via the I/O interface 239. The initial image includes a subject, such as a person. The bounding-box module 202 detects a bystander in an initial image. A bystander is a person that is not the subject of the initial image, such as people walking, running, riding a bicycle, standing behind the subject, or otherwise within the initial image. In different examples, a bystander may be in the foreground (e.g., a person crossing in front of the camera), at the same depth as the subject (e.g., a person standing to the side of the subject), or in the background. In some examples, there may be more than one bystander in the initial image. The bystander may be a human in an arbitrary pose, e.g., standing, sitting, crouching, lying down, jumping, etc. The bystander may face the camera, may be at an angle to the camera, or may face away from the camera. For example, FIG. 3A illustrates an example initial image 300 of a subject and a bystander. The subject is a woman walking and the bystander is a man on a scooter.

The bounding-box module 202 generates a bystander box that includes the bystander. In some embodiments, the bystander box is a rectangular-shaped bounding box that encompasses all pixels for the bystander. The bounding-box module 202 may detect the bystander by performing object recognition, comparing the objects to object priors of people, and discarding objects that are not people. In some embodiments, the bounding-box module 202 uses a machine-learning algorithm, such as a neural network or more specifically, a convolutional neural network, to identify the bystander and generate the bystander box. The bystander box is associated with x- and y-coordinates for the bounding box.

The bystander in the initial image is attached to an object. For example, the bystander may be riding a bike, standing next to or holding a bag, holding an umbrella, riding a scooter, etc. The bounding-box module 202 generates bounding boxes for objects in the initial image. The objects may include non-people, such as purses, strollers, scooters, etc. and also people and/or portions of people, such as a person's face and a person's pants. The objects may also include pets, fixed objects (e.g., lampposts, trash cans, etc.), or other types of objects. When a bounding box is associated with a position (e.g., x- and y-coordinates of the bounding box, x- and y-coordinates of a center of the bounding box and a change in y and a change in x to indicate the distance to the edges of the bounding box, etc.) and an annotation of the type of object, the bounding box may be referred to as a localizer box.

Figure 3B:
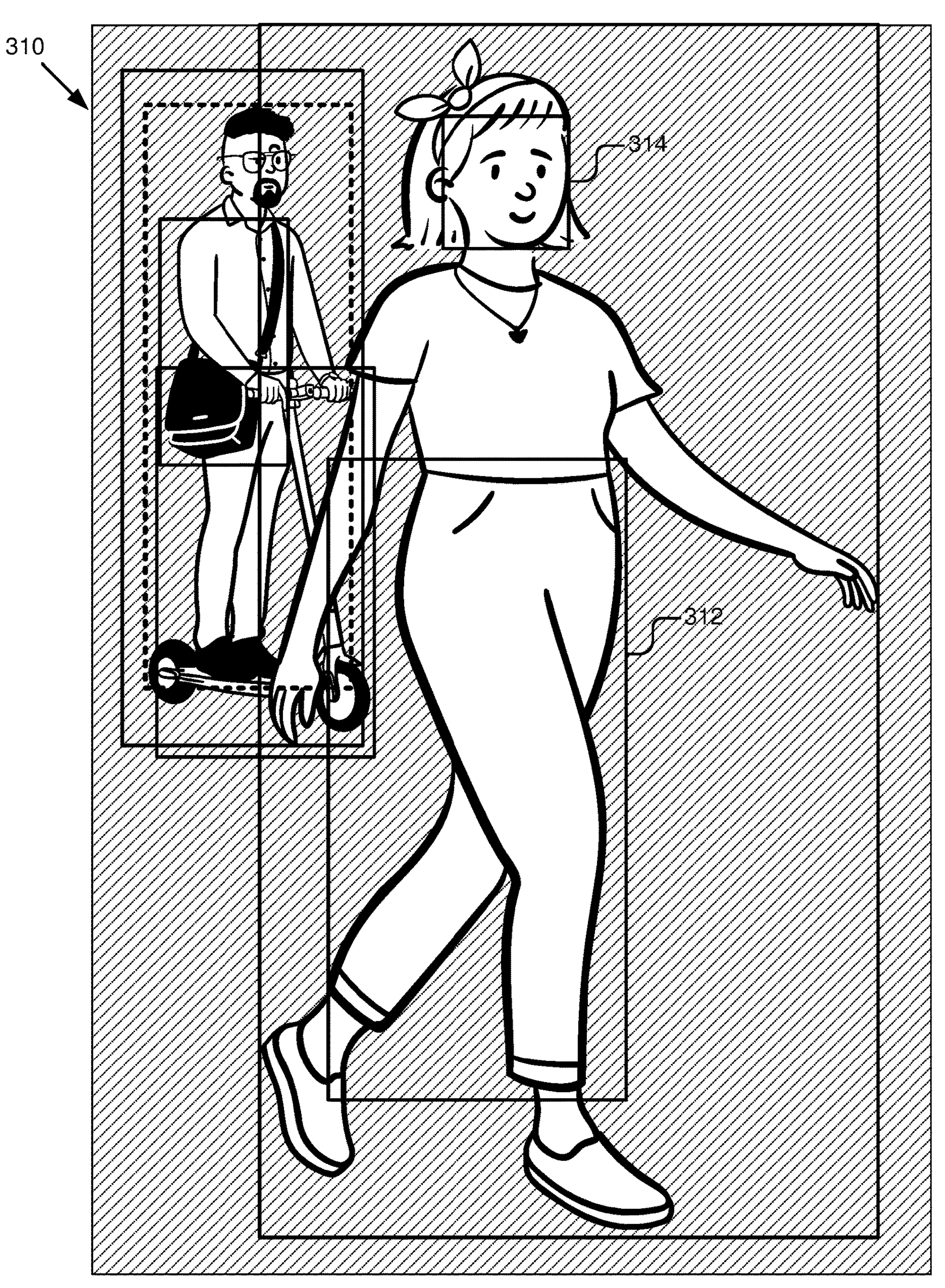
FIG. 3B illustrates an example initial image with a bystander box and localizer boxes, according to some embodiments described herein.

The bounding-box module 202 generates localizer boxes that encompass the bystander and one or more objects that are attached to the bystander in the initial image. For example, FIG. 3B illustrates an example initial image 310 with a bystander box as illustrated by the dashed box around the man on the scooter and localizer boxes. Various localizer boxes encompass objects, such as the messenger bag that the bystander is wearing and clothing items, such as pants on the bystander and pants on the subject 312, as well as the face of the bystander and the face of the subject 314 of the initial image.

Figure 3C:
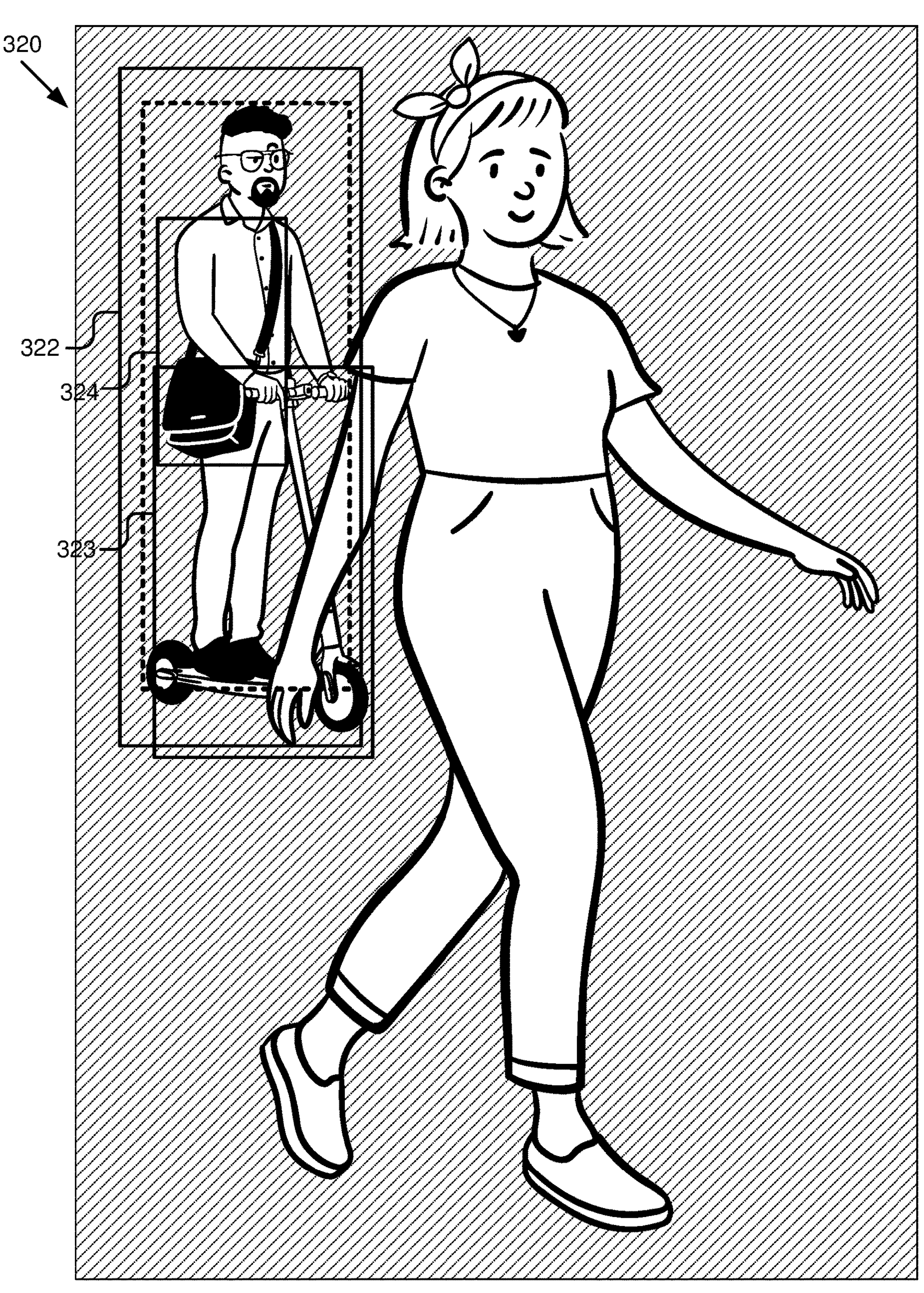
FIG. 3C illustrates an example initial image with box aggregator outputs, according to some embodiments described herein.

The bounding-box module 202 removes the localizer boxes that are associated with the subject of the initial image, which were localizer boxes 312 and 314 in FIG. 3B. FIG. 3C illustrates an example initial image 320 where the localizer boxes associated with the subject of the initial image are removed.

The bounding-box module 202 aggregates the bystander box and the localizer boxes to form an aggregated box. The bounding-box module 202 may determine whether the aggregated box is large enough to encompass the bystander and the object. In some embodiments, the bounding-box module 202 compares an area of the aggregated box to an area of each of the localizer boxes. For example, with reference to FIG. 3C, the bounding-box module 202 compares an area of the dashed box around the bystander to the solid-line box 322 that encompasses the bystander, the message bag, and the scooter; an area of the dashed box to the solid-line box 323 that encompasses the scooter; and an area of the dashed box to the solid-line box 324 that encompasses the messenger bag.

The bounding-box module 202 computes an intersection over union (IoU) ratio that is a ratio of an area of overlap between the aggregated box and each of the localizer boxes divided by an area of union between the aggregated box and the each of the localizer boxes. For each of the localizer boxes, if the IoU ratio exceeds a threshold value or if the area of overlap between the aggregated box and each of the localizer boxes exceeds an occupancy threshold, the bounding-box module 202 increases a size of the aggregated box until the threshold value or the occupancy threshold is met.

Figure 3D:
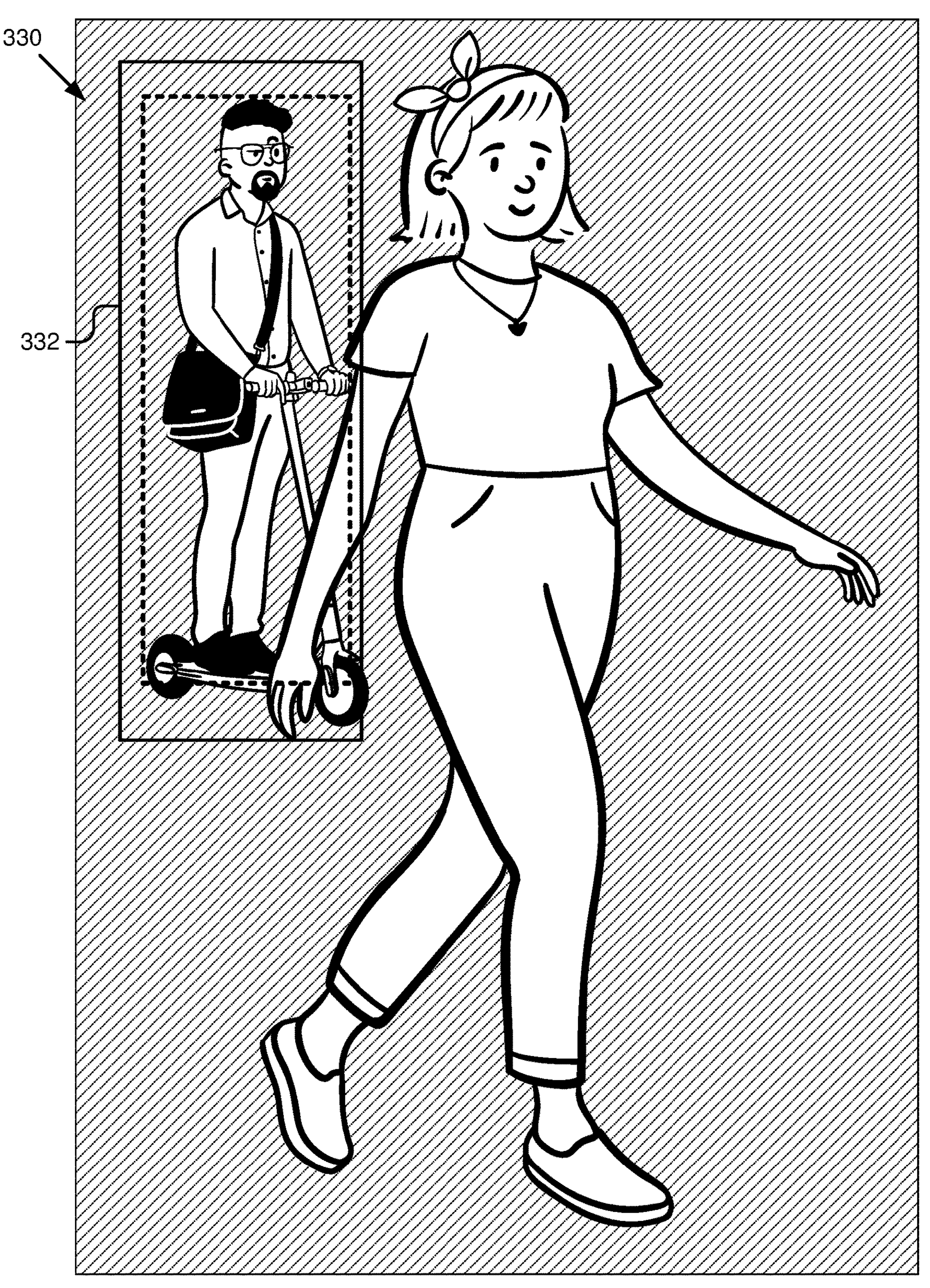
FIG. 3D illustrates an example initial image with an aggregated box and bystander box, according to some embodiments descried herein.

In some embodiments, once a size of the aggregated box is finalized, the bounding-box module 202 pads the aggregated box. For example, the bounding-box module 202 pads the aggregated box with a predetermined amount of pixels outside of the aggregated box (e.g., 10 pixels) to ensure that the aggregated box is inclusive. In some implementations, the padding may be equal on all four sides of the aggregated box. In some implementations, different amount of padding may be used on different sides (e.g., 0 pixels on the left side, 5 pixels on the top and bottom, 10 pixels on the right, etc.). FIG. 3D illustrates an example initial image 330 with an aggregated box 332 and bystander box. The aggregated box 332 is larger than the bystander box (which encompasses the bystander) in dashed lines because it encompasses the bystander and attached objects—the messenger bag and the scooter.

In some embodiments, the media application 103 includes a segmenter 204 that generates a bystander mask. In some embodiments, the media application 103 includes a machine-learning module 206 that generates a trained machine-learning model that segments the initial image and outputs a bystander mask. In some embodiments, the segmenter 204 is used when there is no overlap between the bystander and a subject of the initial image and the machine-learning module 206 is used when there is overlap between the bystander and the subject. In some embodiments, the segmenter 204 also employs machine-learning techniques or works in conjunction with the machine-learning module 206.

The segmenter 204 segments the bystander and the one or more objects within the aggregated box of the initial image to generate a bystander mask. In some embodiments, the segmenter 204 includes a set of instructions executable by the processor 235 to generate the bystander mask. In some embodiments, the segmenter 204 is stored in the memory 237 of the computing device 200 and can be accessible and executable by the processor 235.

A bystander mask is generated that encompasses the bystander and the one or more objects from the initial image so that the bystander and the objects are removed from the initial image. This process is more difficult when the bystander is attached to one or more objects because it is difficult to identify the objects attached to the bystander. In some embodiments, the bystander mask is generated based on generating superpixels on the input image and matching superpixel centroids to depth map values to cluster detections based on depth. More specifically, depth values in a masked area may be used to determine a depth range and superpixels may be identified that fell within the depth range. However, the depth of the objects attached to the bystander is the same as the ground, which may result in an overinclusive bystander mask.

Another technique for generating a bystander mask includes weighing depth values based on how close the depth values were to the bystander mask where weights were represented by a distance transform map. However, the bystander mask may be both overinclusive of the ground and underinclusive of some of the objects.

In some embodiments, the segmenter 204 such technical problems by receiving the initial image that includes the aggregated box and segmenting the foreground from the background to distinguish the objects attached to the bystander from the background, such as a sidewalk. The segmenter 204 generates a bystander mask using the pixels for the bystander and the objects attached to the bystander within the aggregated box. The subset of pixels used for the bystander mask are less than the pixels within the aggregated box.

In some embodiments, the task of generating a bystander mask is further complicated by the subject occluding part of the bystander. For example, turning to FIG. 3A, the right arm of the subject overlaps with the scooter attached to the bystander. If the segmenter 204 generates a bystander mask without accounting for the subject, the bystander mask can include part of the subject and the inpainter module may remove part of the subject's arm. In some embodiments, the segmenter 204 determines if a subject of the initial image occludes the bystander and responsive to the subject of the initial image occluding the bystander, generates a subject mask and updates the bystander mask to remove pixels that are within the subject mask.

The machine-learning module 206 generates a trained model that is herein referred to as a machine-learning model. In some embodiments, the machine-learning module 206 is configured to apply the machine-learning model to input data, such as application data 266 (e.g., an initial image captured by the user device 115) to output a bystander mask. In some embodiments, the machine-learning module 206 may include software code to be executed by processor 235. In some embodiments, the machine-learning module 206 is stored in the memory 237 of the computing device 200 and can be accessible and executable by the processor 235.

In some embodiments, the machine-learning module 206 may specify a circuit configuration (e.g., for a programmable processor, for a field programmable gate array (FPGA), etc.) enabling processor 235 to apply the machine-learning model. In some embodiments, the machine-learning module 206 may include software instructions, hardware instructions, or a combination. In some embodiments, the machine-learning module 206 may offer an application programming interface (API) that can be used by the operating system 262 and/or other applications 264 to invoke the machine-learning module 206, e.g., to apply the machine-learning model to application data 266 to output the segmentation mask.

The machine-learning module 206 uses training data to generate a trained machine-learning model. For example, training data may include images with a subject, a bystander, one or more objects attached to the bystander, an aggregated box, and where the bystander and the one or more objects are segmented and associated with a bystander mask. In some implementations, the aggregated box may be manually generated for each image in the training data.

Training data may be obtained from any source, e.g., a data repository specifically marked for training, data for which permission is provided for use as training data for machine learning, etc. In some embodiments, the training may occur on the media server 101 that provides the training data directly to the user device 115, the training occurs locally on the user device 115, or a combination of both.

In some embodiments, training data may include synthetic data generated for the purpose of training, such as data that is not based on activity in the context that is being trained, e.g., data generated from simulated or computer-generated images/videos, etc. The training data may include synthetic images of a subject that partially occludes a bystander. In some embodiments, the synthetic images are generated by superimposing a two-dimensional object or a three-dimensional object onto a background image. The three-dimensional object may be rendered from a particular view to transform the three-dimensional object into a two-dimensional object. In some embodiments, the synthetic images are generated by superimposing multiple people and objects onto a background to emulate compound or occlusion effects. Different masks may be added to the synthetic images, such as people masks and object masks to train a raw machine-learning model to distinguish between people and objects in the synthetic images.

In some embodiments, the machine-learning module 206 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The machine-learning module 206 may read the data file for the trained model and implement neural networks with node connectivity, layers, and weights based on the model structure or form specified in the trained model.

The trained machine-learning model may include one or more model forms or structures. For example, model forms or structures can include any type of neural-network, such as a linear network, a deep-learning neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., an input layer) may receive data as input data or application data. Such data can include, for example, one or more pixels per node, e.g., when the trained model is used for analysis, e.g., of an initial image. Subsequent intermediate layers may receive as input, output of nodes of a previous layer per the connectivity specified in the model form or structure. These layers may also be referred to as hidden layers. For example, a first layer may output a segmentation between a foreground and a background. A final layer (e.g., output layer) produces an output of the machine-learning model. For example, the output layer may receive the segmentation of the initial image into a foreground and a background and output whether a pixel is part of a bystander mask, a subject mask, or neither. In some implementations, model form or structure also specifies a number and/or type of nodes in each layer.

In different implementations, the trained model can include one or more models. One or more of the models may include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a graphics processing unit (GPU), or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM).

In some implementations, the trained model may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using training data, to produce a result.

Training may include applying supervised learning techniques. In supervised learning, the training data can include a plurality of inputs (e.g., images, aggregated boxes, person masks, etc.) and a corresponding groundtruth output for each input (e.g., a groundtruth bystander mask that correctly identifies the bystander and attached objects for each image). Based on a comparison of the output of the model with the groundtruth output, values of the weights are automatically adjusted, e.g., in a manner that increases a probability that the model produces the groundtruth output for the image.

In various implementations, a trained model includes a set of weights, or embeddings, corresponding to the model structure. In some implementations, the trained model may include a set of weights that are fixed, e.g., downloaded from a server that provides the weights. In various implementations, a trained model includes a set of weights, or embeddings, corresponding to the model structure. In implementations where data is omitted, the machine-learning module 206 may generate a trained model that is based on prior training, e.g., by a developer of the machine-learning module 206, by a third-party, etc. In some implementations, the trained model may include a set of weights that are fixed, e.g., downloaded from a server that provides the weights.

Figure 3E:
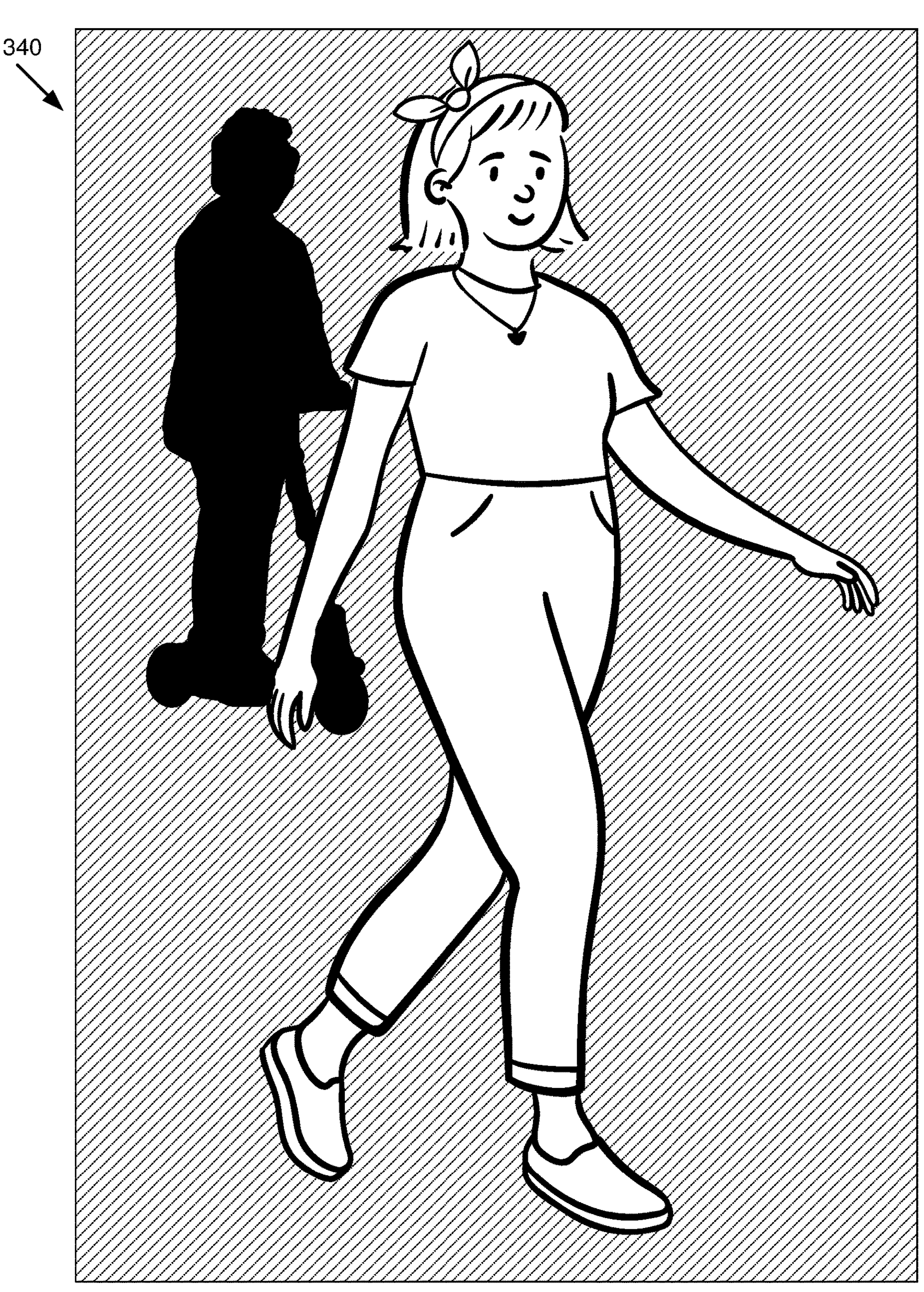
FIG. 3E illustrates an example initial image with a bystander mask that encompasses the bystander and attached objects, according to some embodiments.

In some embodiments, the machine-learning module 206 receives an initial image with a subject, a bystander associated with one or more objects, and an aggregated box that surrounds the bystander and the one or more objects. The machine-learning module 206 provides the initial image as input to the trained machine-learning model. In some embodiments, the trained machine-learning model outputs a bystander mask that includes a subset of pixels within the aggregated box. FIG. 3E illustrates an example initial image 340 with a bystander mask (illustrated in solid black) that encompasses the bystander and attached objects.

In some embodiments, the machine-learning model outputs a confidence value for each bystander mask output by the trained machine-learning model. The confidence value may be expressed as a percentage, a number from 0 to 1, etc. For example, the machine-learning model outputs a confidence value of 85% for a confidence that a bystander mask correctly incorporates the bystander and attached objects and does not include pixels from a subject. In some embodiments, where the confidence value falls below a threshold value, the inpainter module 208 applies a blur or other effect around the edges of the bystander to minimize any errors.

In some embodiments, the machine-learning module 206 receives feedback from a user on the user device 115. The feedback may take the form of a user that posts the inpainted image, that deletes the inpainted image, that shares the inpainted image, etc. The machine-learning module 206 revises parameters for the machine-learning model based on the feedback.

The inpainter module 208 generates an inpainted image that replaces all pixels within the bystander mask with pixels that match a background in the initial image. In some embodiments, the inpainter module 208 includes a set of instructions executable by the processor 235 to generate the inpainted image. In some embodiments, the inpainter module 208 is stored in the memory 237 of the computing device 200 and can be accessible and executable by the processor 235.

Figure 3F:
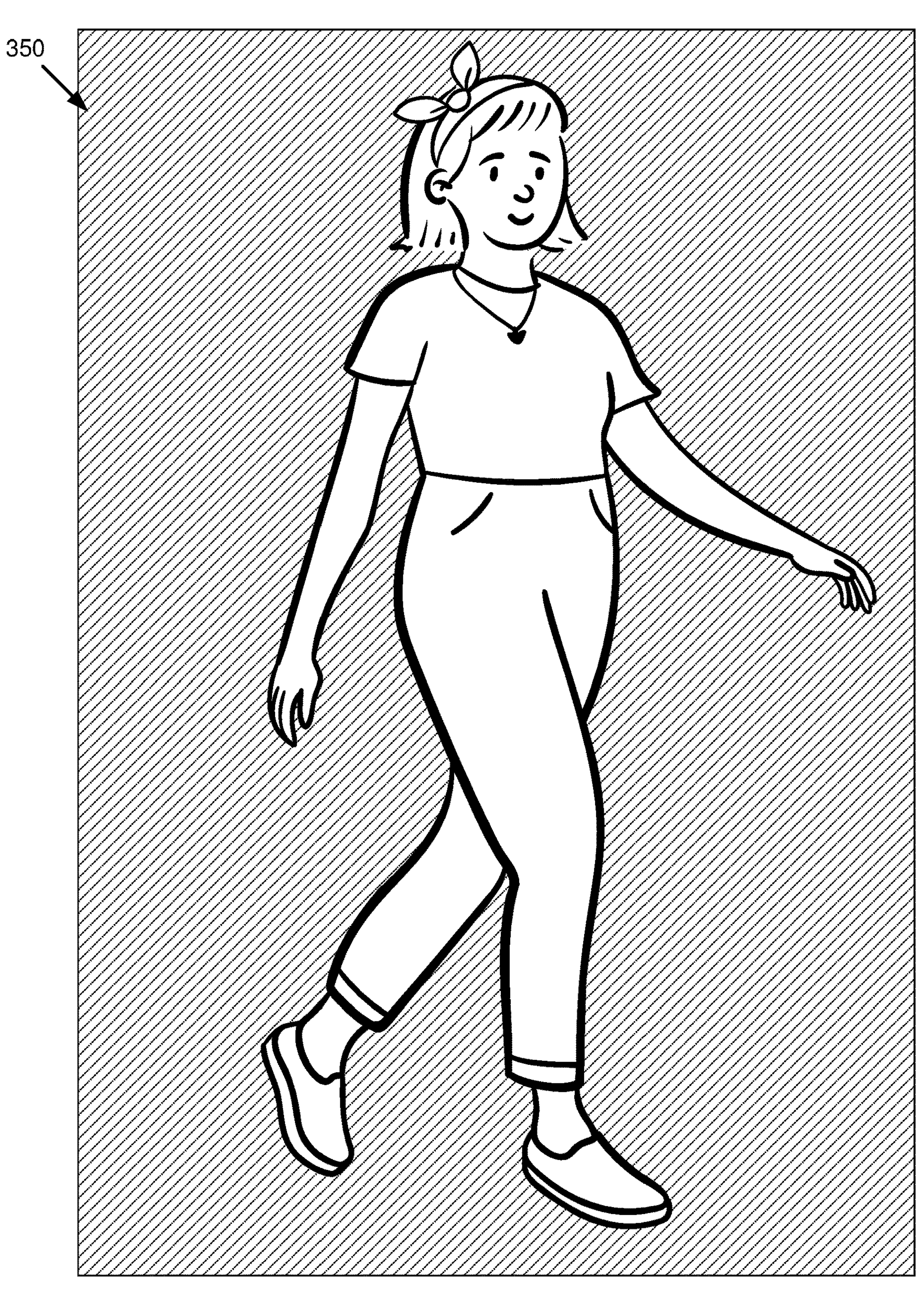
FIG. 3F illustrates an example final image where the bystander and object is removed, according to some embodiments described herein.

In some embodiments, the inpainter module 208 receives an initial image with a bystander mask from the machine-learning module 206. The inpainter module 208 replaces all pixels within the bystander mask with pixels that match a background in the initial image. The pixels that match a background may be based on another image of the same location without the subject and/or the bystander. Alternatively, the inpainter module 208 may match the pixels removed from the bystander mask based on pixels that are surrounding the bystander mask. For example, where the bystander was standing on the ground, the inpainter module 208 replaces the pixels with pixels of the ground. FIG. 3F illustrates an example inpainted image 350 where the bystander and object is removed. Other inpainting techniques are possible, including a machine-learning based inpainter technique.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

The user interface module 210 generates a user interface that includes the inpainted image. In some embodiments, the user interface includes options for editing the inpainted image, sharing the inpainted image, adding the inpainted image to a photo album, etc.

Example Flowcharts

FIG. 4 illustrates an example flowchart 400 to generate an inpainted image with bystander and attached object removed, according to some embodiments described herein. The method illustrated in flowchart 400 may be performed by the computing device 200 in FIG. 2. In some embodiments, the flowchart 400 is performed by the user device 115, the media server 101, or in part on the user device 115 and in part on the media server 101.

The method 400 of FIG. 4 may begin at block 402. At block 402, a bystander in an initial image is detected. Block 402 may be followed by block 404.

At block 404, a bystander box that includes the bystander is generated where all pixels for the bystander are within the bystander box. Block 404 may be followed by block 406.

At block 406, localizer boxes that encompass the bystander and one or more objects that are attached to the bystander are generated. Block 406 may be followed by block 408.

At block 408, the bystander box and the localizer boxes are aggregated to form an aggregated box. In some embodiments, the aggregated box is first defined as being the same as the bystander box and then particular localizer boxes are added based on applying an IoU calculation. Block 408 may be followed by block 410.

At block 410, a segmenter is applied to the initial image, based on the aggregated box, to segment the bystander and the one or more objects from the initial image to generate a bystander mask, where the bystander mask includes a subset of pixels within the aggregated box. Block 410 may be followed by block 412.

At block 412, an inpainted image is generated that replaces all pixels within the bystander mask with pixels that match a background in the initial image.

FIG. 5 illustrates an example flowchart 500 to remove a bystander with an object, according to some embodiments described herein. The method illustrated in flowchart 500 may be performed by the computing device 200 in FIG. 2. In some embodiments, the flowchart 500 is performed by the user device 115, the media server 101, or in part on the user device 115 and in part on the media server 101.

The method 500 of FIG. 5 may begin at block 502. The method illustrated in flowchart 500 may be performed by the computing device 200 in FIG. 2. In some embodiments, the flowchart 500 is performed by the user device 115, the media server 101, or in part on the user device 115 and in part on the media server 101.

At block 502, a synthetic training data set that includes training images that each include a bystander attached to an object and a subject. In some implementations, the subject in at least a subset of the training images occludes the bystander and/or attached objects. For supervised learning, the training data set also includes a groundtruth bystander mask for each training image. Block 502 may be followed by block 504.

At block 504, a trained machine-learning model is obtained by training a raw machine-learning model using the synthetic training dataset as input, where the training is performed using supervised learning. Under supervised learning, the model outputs a predicted bystander box for a training image. The predicted bystander box is compared to a groundtruth bystander mask that corresponds to the training image. Based on the comparison, feedback is provided to adjust one or more parameters of the model under training (raw model). In some implementations, gradient descent may be used to adjust the parameters. The process is performed with a sufficiently large training dataset such that the error between predicted and groundtruth bystander boxes is reduced. Training may be completed when the error falls below a threshold, or when the entire training dataset has been utilized. Training may be repeated any number of times with additional training images. Still further, re-training may be initiated based on user feedback on inpainted output images, e.g., if the user feedback indicates that the inpainted images are unsatisfactory (e.g., do not completely remove bystander and/or attached objects). The trained model may be made available for local use to user devices 115 as a part of media application 103 and/or stored for use on media server 101. Block 504 may be followed by block 506.

At block 506, an initial image with an aggregated box that surrounds a bystander and one or more objects attached to the bystander is received as input to the trained machine-learning model. Block 506 may be followed by block 508.

At block 508, a bystander mask that includes a subset of pixels within the aggregated box is output with the trained machine-learning model.

Figure 6:
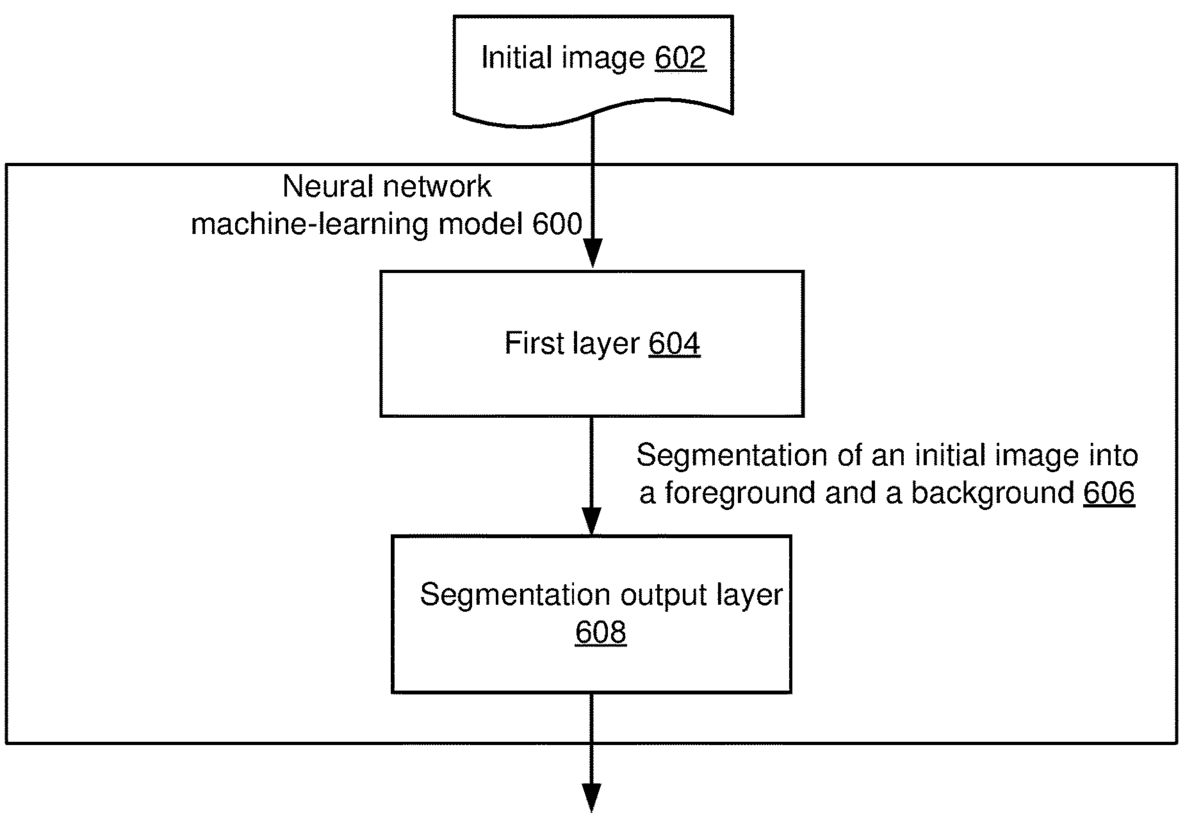
FIG. 6 illustrates operation of an example neural network, according to some embodiments described herein.

FIG. 6 illustrates operation of an example neural network. The neural network machine-learning model 600 includes a first layer 604 and a segmentation output layer 608. Although two layers are illustrated, the neural network machine-learning model 600 may include more layers or fewer layers.

An initial image 602 is provided as input to the input layer 604. For example, the initial image 602 includes a subject and a bystander that is attached to one or more objects. The first layer 604 segments the initial image 602 into a foreground and a background by, for each pixel, classifying the pixel as one of: part of the foreground or part of the background 606 of the initial image 602.

The segmentation of the initial image 602 into the foreground and the background 606 is provided as input to the segmentation output layer 608. The segmentation output layer 608 outputs whether the pixel is part of a bystander mask, a subject mask, or neither 610.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
detecting a bystander in an initial image;
generating a bystander box that includes the bystander, wherein all pixels for the bystander are within the bystander box;
generating one or more localizer boxes that encompass the bystander and one or more objects that are attached to the bystander;
aggregating the bystander box and the one or more localizer boxes to form an aggregated box by:
defining the aggregated box as being the bystander box and, for each particular localizer box of the one or more localizer boxes, computing an intersection over union (IoU) ratio of the aggregated box to the particular localizer box, and
responsive to the IoU ratio exceeding a threshold value or responsive to an area of overlap between the aggregated box and the particular localizer box exceeding an occupancy threshold, increasing a size of the aggregated box;
applying a segmenter to the initial image, based on the aggregated box, to segment the bystander and the one or more objects from the initial image to generate a bystander mask, wherein the bystander mask includes a subset of pixels within the aggregated box; and
generating an inpainted image, wherein all pixels within the bystander mask are replaced in the inpainted image with pixels that match a background in the initial image.

2. The method of claim 1, further comprising:
padding the aggregated box with respective amounts of pixels on two or more sides of the aggregated box.

3. The method of claim 2, wherein the IoU ratio is the area of overlap between the aggregated box and the particular localizer box divided by an area of union between the aggregated box and the particular localizer box.

4. The method of claim 1, wherein applying the segmenter to the initial image includes segmenting a foreground from the background to distinguish the one or more objects attached to the bystander from the background.

5. The method of claim 1, further comprising:
determining if a subject of the initial image occludes the bystander; and
responsive to determining that the subject of the initial image occludes the bystander, generating a subject mask and updating the bystander mask to remove pixels that are within the subject mask.

6. The method of claim 1, wherein the segmenter is a trained machine-learning model.

7. The method of claim 1, wherein the one or more localizer boxes include a subject in the initial image, and further comprising:
removing corresponding localizer boxes that are associated with the subject.

8. A non-transitory computer-readable medium with instructions stored thereon that, responsive to execution by one or more processing devices, cause the one or more processing devices to perform operations comprising:
detecting a bystander in an initial image;
generating a bystander box that includes the bystander, wherein all pixels for the bystander are within the bystander box;
generating one or more localizer boxes that encompass the bystander and one or more objects that are attached to the bystander;
aggregating the bystander box and the one or more localizer boxes to form an aggregated box by:
defining the aggregated box as being the bystander box and, for each particular localizer box of the one or more localizer boxes, computing an intersection over union (IoU) ratio of the aggregated box to the particular localizer box, and
responsive to the IoU ratio exceeding a threshold value or responsive to an area of overlap between the aggregated box and the particular localizer box exceeding an occupancy threshold, increasing a size of the aggregated box;
applying a segmenter to the initial image, based on the aggregated box, to segment the bystander and the one or more objects from the initial image to generate a bystander mask, wherein the bystander mask includes a subset of pixels within the aggregated box; and generating an inpainted image, wherein all pixels within the bystander mask are replaced in the inpainted image with pixels that match a background in the initial image.

9. The computer-readable medium of claim 8, wherein the operations further comprise:

padding the aggregated box with respective amounts of pixels on two or more sides of the aggregated box, wherein at least two sides are padded with a different amount of pixels.

10. The computer-readable medium of claim 8, wherein the IoU ratio is the area of overlap between the aggregated box and the particular localizer box divided by an area of union between the aggregated box and the particular localizer box.

11. The computer-readable medium of claim 8, wherein applying the segmenter to the initial image includes segmenting a foreground from the background to distinguish the one or more objects attached to the bystander from the background.

12. The computer-readable medium of claim 8, wherein the operations further comprise:

determining if a subject of the initial image occludes the bystander; and responsive to determining that the subject of the initial image occludes the bystander, generating a subject mask and updating the bystander mask to remove pixels that are within the subject mask.

13. The computer-readable medium of claim 8, wherein the segmenter is a trained machine-learning model.

14. The computer-readable medium of claim 8, wherein the one or more localizer boxes include a subject in the initial image, and the operations further comprise:

removing corresponding localizer boxes that are associated with the subject.

15. A computing device comprising:

a processor; and a memory coupled to the processor, with instructions stored thereon that, when executed by the processor, cause the processor to perform operations comprising:

detecting a bystander in an initial image;

generating a bystander box that includes the bystander, wherein all pixels for the bystander are within the bystander box;

generating one or more localizer boxes that encompass the bystander and one or more objects that are attached to the bystander;

aggregating the bystander box and the one or more localizer boxes to form an aggregated box by:

defining the aggregated box as being the bystander box and, for each particular localizer box of the one or more localizer boxes, computing an intersection over union (IoU) ratio of the aggregated box to the particular localizer box, and responsive to the IoU ratio exceeding a threshold value or responsive to an area of overlap between the aggregated box and the particular localizer box exceeding an occupancy threshold, increasing a size of the aggregated box;

applying a segmenter to the initial image, based on the aggregated box, to segment the bystander and the one or more objects from the initial image to generate a bystander mask, wherein the bystander mask includes a subset of pixels within the aggregated box; and generating an inpainted image, wherein all pixels within the bystander mask are replaced in the inpainted image with pixels that match a background in the initial image.

16. The computing device of claim 15, wherein the operations further comprise:

padding the aggregated box with respective amounts of pixels on two or more sides of the aggregated box.

17. The computing device of claim 15, wherein the IoU ratio is the area of overlap between the aggregated box and the particular localizer box divided by an area of union between the aggregated box and the particular localizer box.

18. The computing device of claim 15, wherein applying the segmenter to the initial image includes segmenting a foreground from the background to distinguish the one or more objects attached to the bystander from the background.

19. The computing device of claim 15, wherein the operations further include:

determining if a subject of the initial image occludes the bystander; and responsive to determining that the subject of the initial image occludes the bystander, generating a subject mask and updating the bystander mask to remove pixels that are within the subject mask.

20. The computing device of claim 15, wherein the segmenter is a trained machine-learning model.

* * * * *